United States Patent
Elshani Rama et al.

(10) Patent No.: US 12,407,521 B2
(45) Date of Patent: Sep. 2, 2025

(54) SAFE AND SECURE COMMUNICATION

(71) Applicant: Infineon Technologies AG, Neubiberg (DE)

(72) Inventors: Donjete Elshani Rama, Unterhaching (DE); Alexander Zeh, Munich (DE); Jörg Syassen, Feldkirchen-Westerham (DE)

(73) Assignee: Infineon Technologies AG, Neubiberg (DE)

( * ) Notice: Subject to any disclaimer, the term of this patent is extended or adjusted under 35 U.S.C. 154(b) by 261 days.

(21) Appl. No.: 18/298,602

(22) Filed: Apr. 11, 2023

(65) Prior Publication Data

US 2024/0348450 A1  Oct. 17, 2024

(51) Int. Cl.
*H04L 29/06* (2006.01)
*H04L 9/06* (2006.01)
*H04L 9/32* (2006.01)

(52) U.S. Cl.
CPC .......... *H04L 9/3242* (2013.01); *H04L 9/0637* (2013.01)

(58) Field of Classification Search
None
See application file for complete search history.

(56) References Cited

U.S. PATENT DOCUMENTS

2021/0089040 A1* 3/2021 Ebrahimi Afrouzi ........................ G05D 1/0248
2021/0119780 A1* 4/2021 Hassan ................... H04L 9/088
2021/0211858 A1* 7/2021 Ellenbeck ......... H04W 72/0466

FOREIGN PATENT DOCUMENTS

WO  WO-2019014426 A1 * 1/2019 ............. H04L 45/24

* cited by examiner

*Primary Examiner* — Andrew J Steinle
(74) *Attorney, Agent, or Firm* — Harrity & Harrity, LLP

(57) ABSTRACT

A device may compute redundancy information based on plaintext. The device may determine modified additional data based on the redundancy information and the additional data. The device may encrypt the plaintext to obtain ciphertext. The device may compute a message authentication code based on the ciphertext and the modified additional data. The device may transmit a message including the ciphertext, the additional data, and the message authentication code.

24 Claims, 6 Drawing Sheets

SAFE AND SECURE COMMUNICATION

BACKGROUND

An authenticated encryption with additional data (AEAD) scheme is an encryption scheme that provides confidentiality and authenticity of data in addition to authenticated but not encrypted additional data. In general, AEAD aims to provide confidentiality, authenticity, and integrity for a message consisting of plaintext data and additional data (also referred to as associated data or additional authenticated data), such as header data. AEAD uses a message authentication code (MAC) to confirm that encrypted data is authentic. An AEAD scheme may be used in, for example, an automotive application, where functional safety, real-time constraints, reusability, cost, flexibility, strong/robust security, and energy consumption play an important role.

SUMMARY

In some implementations, a device includes one or more components to compute redundancy information based on plaintext; determine modified additional data based on the redundancy information and the additional data; encrypt the plaintext to obtain ciphertext; compute a message authentication code (MAC) based on the ciphertext and the modified additional data; and transmit a message including the ciphertext, the additional data, and the MAC.

In some implementations, a device includes one or more components to: receive a message including ciphertext, additional data, and a first MAC; decrypt the ciphertext to obtain decrypted plaintext; compute redundancy information based on the decrypted plaintext; determine modified additional data based on the redundancy information and the additional data; compute a second MAC based on the ciphertext and the modified additional data; and determine whether the second MAC matches the first MAC.

In some implementations, a system includes a transmitter to: compute first redundancy information based on plaintext, determine first modified additional data based on the first redundancy information and additional data, encrypt the plaintext to obtain ciphertext, compute a first MAC based on the ciphertext and the first modified additional data, and transmit a message including the ciphertext, the additional data, and the first MAC; and a receiver to: receive the message including the ciphertext, the additional data, and the first MAC; decrypt the ciphertext to obtain decrypted plaintext; compute second redundancy information based on the decrypted plaintext; determine second modified additional data based on the second redundancy information and the additional data; compute a second MAC based on the ciphertext and the second modified additional data; and determine whether second MAC matches the first MAC.

DETAILED DESCRIPTION

Figure 1A:
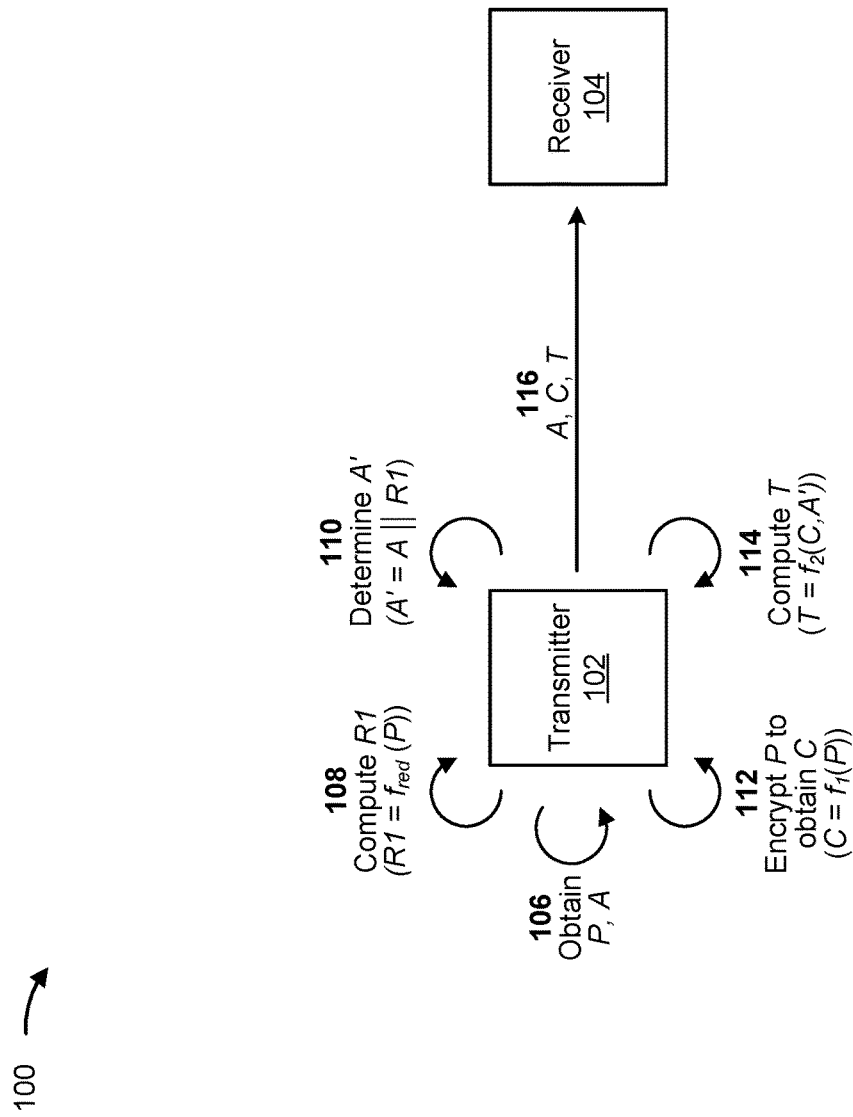
FIGS. 1A and 1B are diagrams of an example associated with safe and secure communication as described herein.

The following detailed description of example implementations refers to the accompanying drawings. The same reference numbers in different drawings may identify the same or similar elements.

As described above, an AEAD scheme may be designed to ensure confidentiality, authenticity, and data integrity for a message consisting of plaintext data and (optional) additional data. In practice, a transmitter may be configured to implement an AEAD scheme that generates a message including ciphertext (i.e., encrypted plaintext) and a MAC (sometimes referred to as a tag). While the additional data is not encrypted, the additional data is protected by the tag. That is, only authenticity and integrity are provided for the additional data. However, according to a conventional AEAD scheme that uses an advanced encryption standard with Galois/counter mode (AES-GCM) algorithm, an error that occurs during encryption of plaintext at a transmitter or during decryption of ciphertext at a receiver may go undetected.

For example, the transmitter may obtain plaintext P and additional data A. The transmitter may provide the plaintext P as an input to a first function $f_1$ to generate ciphertext. Here, if no error occurs during encryption, then the transmitter would generate ciphertext C. However, if an error occurs during encryption, then the transmitter generates erroneous ciphertext C" (i.e., ciphertext that is different from ciphertext C). The transmitter may then provide the erroneous ciphertext C" and the additional data A as inputs to a second function $f_2$, an output of which is an erroneous tag T" (rather than a tag T that would have been generated based on the ciphertext C). The transmitter then transmits a message including the additional data A, the erroneous ciphertext C", and the erroneous tag T". A receiver receives the message and provides the erroneous ciphertext C" and the additional data A as inputs to an inverse second function $f_2^{-1}$, an output of which is a tag T'. Here, the receiver may authenticate the data by confirming that the tag T' matches the erroneous tag T". After authentication, the receiver provides the erroneous ciphertext C" as an input to an inverse first function $f_1^{-1}$, an output of which is decrypted plaintext P" (i.e., decrypted plaintext that is different from decrypted plaintext P' that matches the plaintext P). Thus, in this scenario, the encryption error is undetected and the receiver does not successfully obtain decrypted plaintext P' that matches the plaintext P.

As another example, the transmitter may obtain plaintext P and additional data A. The transmitter may provide the plaintext P as an input to a first function $f_1$ to generate ciphertext. Here, if no error occurs during encryption, then the transmitter would generate ciphertext C. The transmitter may then provide the ciphertext C and the additional data A as inputs to a second function $f_2$, an output of which is a tag T. The transmitter then transmits a message including the additional data A, the ciphertext C, and the tag T. A receiver receives the message and provides the ciphertext C and the additional data A as inputs to an inverse second function $f_2^{-1}$, an output of which is a tag T'. Here, the receiver may authenticate the data by confirming that the tag T' matches the tag T. After authentication, the receiver provides the ciphertext C as an input to an inverse first function $f_1^{-1}$. Here, if an error occurs during decryption, then an output of the inverse first function $f_1^{-1}$ is decrypted plaintext P''' (i.e., decrypted plaintext that is different from decrypted plaintext P' that matches the plaintext P). Thus, in this scenario, the decryption error is undetected and the receiver does not successfully obtain decrypted plaintext P' that matches the plaintext P.

In some systems, to enable detection of an encryption or decryption error, end-to-end protection may be provided by adding a set of cyclic redundancy check (CRC) bits to the data. That is, the transmitter may add a set of CRC bits to the plaintext prior to encryption, and may generate a tag based on the plaintext that includes the set of CRC bits. The transmitter then transmits a message including additional data, ciphertext, and tag. On the receiver side, the receiver can utilize the set of CRC bits to confirm that the plaintext has been encrypted and decrypted without error. That is, the set of CRC bits may enable an encryption or decryption error to be detected, thereby improving functional safety. However, this technique may be undesirable due to the increase in overhead resulting from the need to transmit the set of CRC bits over the communication channel.

Some implementations described herein provide safe and secure communication over a communication channel by enabling a cryptographic error (e.g., an encryption error or a decryption error) to be detected without increasing overhead. In some implementations, a transmitter may compute first redundancy information based on plaintext, determine first modified additional data based on the first redundancy information and additional data, and encrypt the plaintext to obtain ciphertext. The transmitter may then compute a first MAC based on the ciphertext and the first modified additional data, and may transmit a message including the ciphertext, the additional data, and the first MAC. A receiver may receive the message including the ciphertext, the additional data, and the first MAC, decrypt the ciphertext to obtain decrypted plaintext, compute second redundancy information based on the decrypted plaintext, and determine second modified additional data based on the second redundancy information and the additional data. The receiver may then compute a second MAC based on the ciphertext and the second modified additional data, and may determine whether the second MAC matches the first MAC. Notably, redundancy information is not transmitted by the transmitter in association with the safe and secure communication scheme, thereby reducing overhead while improving functional safety by enabling cryptographic error detection. Additional details are provided below.

Figure 1B:
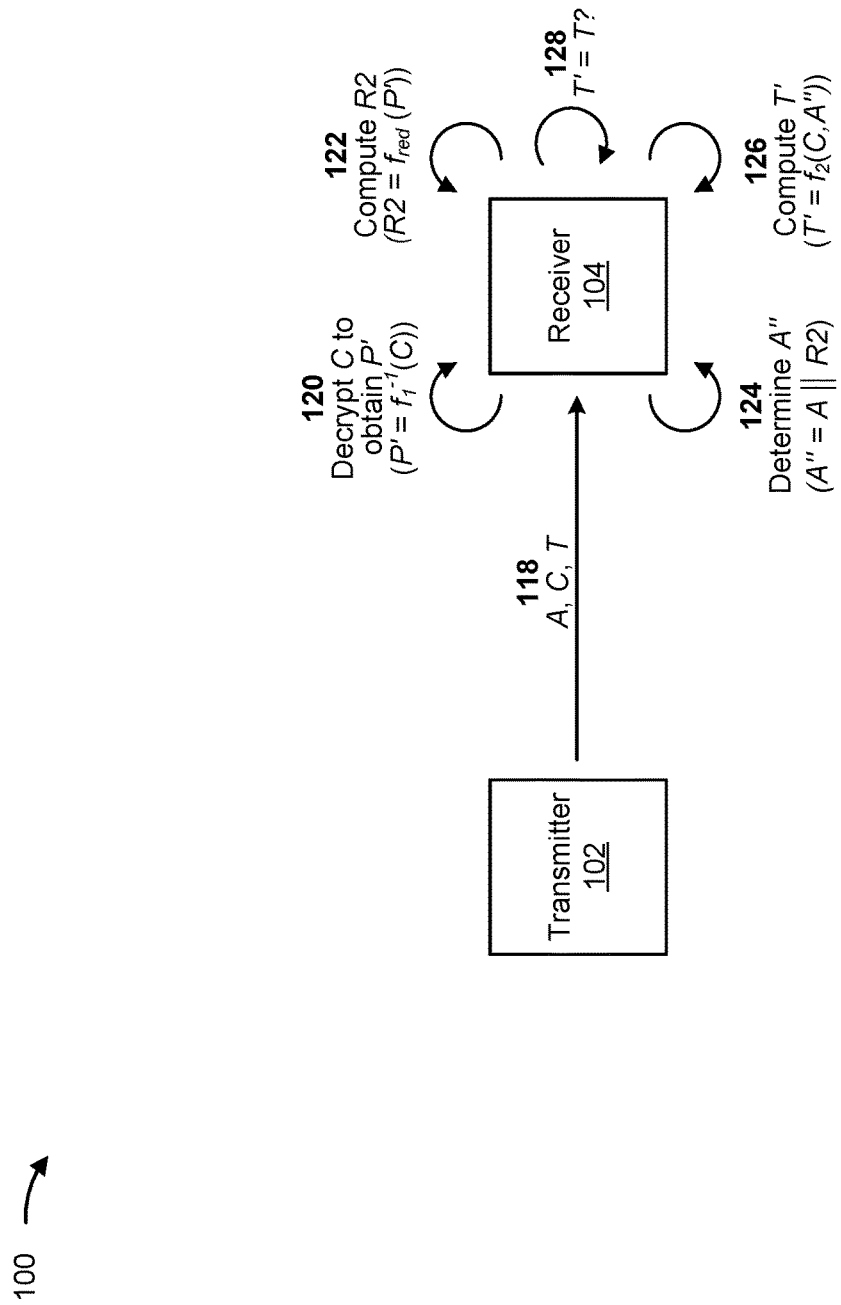

FIGS. 1A and 1B are diagrams of an example 100 associated with safe and secure communication as described herein. As shown in FIGS. 1A and 1B, the example 100 includes a transmitter 102 and a receiver 104. In some implementations, the transmitter 102 and the receiver 104 may be network nodes in, for example, a bus-based communication system that connects a group of network nodes. In some implementations, the transmitter 102 and the receiver 104 are configured to operate in an advanced encryption standard with Galois/counter mode (AES-GCM) operation mode in association with providing AEAD for communications between the transmitter 102 and the receiver 104. In some implementations, the transmitter 102 and the receiver 104 are configured to operate in an Ascon operation mode (e.g., using a light-weight cipher) in association with providing AEAD for communications between the transmitter 102 and the receiver 104.

In some implementations, the transmitter 102 and the receiver 104 may communicate with one another according to a message-based communication protocol. For example, the transmitter 102 may transmit a message as a frame of bits that are serially introduced into a bus and serially received by the receiver 104. Examples of protocols that may be used in a bus-based communication system 100 include controller area network (CAN) protocol, CAN flexible data-rate (FD) protocol, CAN extra-long (XL) protocol, local interconnect network (LIN) protocol, or an Ethernet protocol (e.g., 10base-T1S protocol), among other examples. In some implementations, the transmitter 102 and the receiver 104 are configured to communicate using an AEAD scheme (e.g., such that confidentiality and authenticity of a payload and authentication of additional data is provided for a message transmitted by the transmitter 102 and received by the receiver 104).

As shown in FIG. 1A at reference 106, the transmitter 102 may obtain plaintext P and additional data A that is to be transmitted to the receiver 104 (e.g., via a bus of a bus-based communication system). The plaintext P may include, for example, a payload that is to be transmitted by the transmitter 102 and received by the receiver 104. Notably, the plaintext P is not encrypted (i.e., unencrypted). In some implementations, the plaintext P and the additional data A are to be transmitted according to the AEAD scheme in order to provide confidentiality and authentication of the plaintext P and authentication of the additional data A.

As shown at reference 108, the transmitter 102 may compute first redundancy information R1 based on the plaintext P. Redundancy information is information associated with determining whether the plaintext P has been encrypted by the transmitter 102 without an encryption error and whether ciphertext C has been decrypted by the receiver 104 without a decryption error, as described herein. In some implementations, to compute the first redundancy information R1, the transmitter 102 may apply a redundancy function $f_{red}$ (e.g., an error correction code (ECC) function, a cyclic redundancy check (CRC) function, an error detection code (EDC) function, or the like) to the plaintext P, as shown in FIG. 1A (e.g., R1=$f_{red}$(P)). Here, the first redundancy information R1 may be a result of applying the redundancy function $f_{red}$ to the plaintext P. That is, the transmitter 102 may provide the plaintext P as an input to the redundancy function $f_{red}$, and may receive the first redundancy information R1 as an output of the redundancy function $f_{red}$.

As shown at reference 110, the transmitter 102 may determine first modified additional data A' based on the first redundancy information R1 and the additional data A. Modified additional data is a version of the additional data A that has been modified based on redundancy information. Thus, modified additional data depends on redundancy information based on which the additional data A is modified. As one example, the transmitter 102 may in some implementations append the first redundancy information R1 to the additional data A to generate the first modified additional data A', as indicated in FIG. 1A.

As shown at reference 112, the transmitter 102 may encrypt the plaintext P to obtain ciphertext C (i.e., encrypted plaintext). In some implementations, to encrypt the plaintext P, the transmitter 102 may apply a first function $f_1$ (e.g., a first cryptographic function) to the plaintext P, as shown in FIG. 1A (e.g., C=$f_1$(P)). Here, the ciphertext C may be a result of applying the first function $f_1$ to the plaintext P. That is, the transmitter 102 may provide the plaintext P as an input to the first function $f_1$, and may receive the ciphertext C as an output of the first function $f_1$.

As shown at reference 114, the transmitter 102 may compute a first MAC T based on the ciphertext C and the first modified additional data A'. A MAC T is a value based on which authentication of data transmitted by the transmitter 102 can be confirmed by the receiver 104. In some implementations, to compute the first MAC T, the transmitter 102 may apply a second function $f_2$ (e.g., a second cryptographic function, which may be different from the first cryptographic function or the same as the first cryptographic function) to the ciphertext C and the first modified additional data A', as shown in FIG. 1A (e.g., $T=f_2(C, A')$). Here, the first MAC T may be a result of applying the second function $f_2$ to the ciphertext C and the first modified additional data A'. That is, the transmitter 102 may provide the ciphertext C and the first modified additional data A' as inputs to the second function $f_2$, and may receive the first MAC T as an output of the second function $f_2$.

As shown at reference 116 in FIG. 1A, the transmitter 102 may transmit a message including the ciphertext C, the additional data A, and the first MAC T. Notably, the transmitter 102 does not transmit the first redundancy information R1 or the first modified additional data A'. Rather, the transmitter 102 transmits the original additional data A (i.e., the additional data A without any redundancy information). Thus, the transmitter 102 may in some implementations be configured to refrain from transmitting (e.g., configured not to transmit, or not configured to transmit) the first redundancy information R1 or the first modified additional data A'.

As shown at reference 118 in FIG. 1B, the receiver 104 may receive the message including the ciphertext C, the additional data A, and the first MAC T.

As shown at reference 120, the receiver 104 may decrypt the ciphertext C to obtain decrypted plaintext P'. In some implementations, to decrypt the ciphertext C, the transmitter 102 may apply a first inverse function $f_1^{-1}$ (e.g., an inverse of the first cryptographic function) to the ciphertext C, as shown in FIG. 1B (e.g., $P'=f_1^{-1}(C)$). Here, the decrypted plaintext P' may be a result of applying the first inverse function $f_1^{-1}$ to the ciphertext C. That is, the transmitter 102 may provide the ciphertext C as an input to the first inverse function $f_1^{-1}$, and may receive the decrypted plaintext P' as an output of the first inverse function $f_1^{-1}$.

As shown at reference 122, the receiver 104 may compute second redundancy information R2 based on the decrypted plaintext P'. In some implementations, to compute the second redundancy information R2, the transmitter 102 may apply the redundancy function $f_{red}$ (e.g., the same redundancy function applied by the transmitter 102 in association with computing the first redundancy information R1) to the decrypted plaintext P', as shown in FIG. 1A (e.g., $R2=f_{red}(P')$). Here, the second redundancy information R2 may be a result of applying the redundancy function $f_{red}$ to the decrypted plaintext P'. That is, the transmitter 102 may provide the decrypted plaintext P' as an input to the redundancy function $f_{red}$, and may receive the second redundancy information R2 as an output of the redundancy function $f_{red}$.

As shown at reference 124, the receiver 104 may determine second modified additional data A" based on the second redundancy information R2 and the additional data A. As one example, the receiver 104 may in some implementations append the second redundancy information R2 to the additional data A to generate the second modified additional data A", as indicated in FIG. 1B.

As shown at reference 126, the receiver 104 may compute a second MAC T' based on the ciphertext C and the second modified additional data A". In some implementations, to compute the second MAC T', the transmitter 102 may apply the second function $f_2$ (e.g., the same function applied by the transmitter 102 in association with computing the first MAC T) to the ciphertext C and the second modified additional data A", as shown in FIG. 1B (e.g., $T'=f_2(C, A")$). Here, the second MAC T' may be a result of applying the second function $f_2$ to the ciphertext C and the second modified additional data A". That is, the transmitter 102 may provide the ciphertext C and the second modified additional data A" as inputs to the second function $f_2$, and may receive the second MAC T' as an output of the second function $f_2$.

As shown at reference 128, the receiver 104 may determine whether the second MAC T' matches the first MAC T. That is, the receiver 104 may determine whether the second MAC T' computed by the receiver 104 matches (e.g., is identical to) the first MAC T received by the receiver 104. Here, the second MAC T' matches the first MAC T only if the second modified additional data A" matches the first modified additional data A'. Further, the second modified additional data A" matches the first modified additional data A' only if the second redundancy information R2 matches the first redundancy information R1. Here, because the second redundancy information R2 and the first redundancy information R1 are generated based on the decrypted plaintext P' and the plaintext P, respectively, the second redundancy information R2 matches the first redundancy information R1 only if the decrypted plaintext P' matches the plaintext P'. Thus, if the second MAC T' matches the first MAC T, then the receiver 104 can determine that the plaintext P was encrypted by the transmitter 102 without error and that the decrypted plaintext P' was obtained (i.e., that the ciphertext C was decrypted) by the receiver 104 without error.

In some implementations, the receiver 104 may provide an indication of a result of whether the second MAC T' matches the first MAC T. For example, if the receiver 104 determines that the second MAC T' matches (e.g., is identical to) the first MAC T, then the receiver 104 may provide an authentication indication indicating that the plaintext P and the additional data A have been authenticated. As another example, if the receiver 104 determines that the second MAC T' does not match (e.g., is not identical to) the first MAC T, then the receiver 104 may provide an error indication indicating that the plaintext P and the additional data A have not been authenticated. In some implementations, the error indication may serve as an indication that a cryptographic error (e.g., an error during encryption by the transmitter 102 or an error during decryption by the receiver 104) has been detected.

As noted above, the transmitter 102 and the receiver 104 may in some implementations be configured to operate in an AES-GCM operation mode in association with providing AEAD for messages communicated between the transmitter 102 and the receiver 104.

As indicated above, FIGS. 1A and 1B are provided as examples. Other examples may differ from what is described with regard to FIGS. 1A and 1B.

Figure 2:
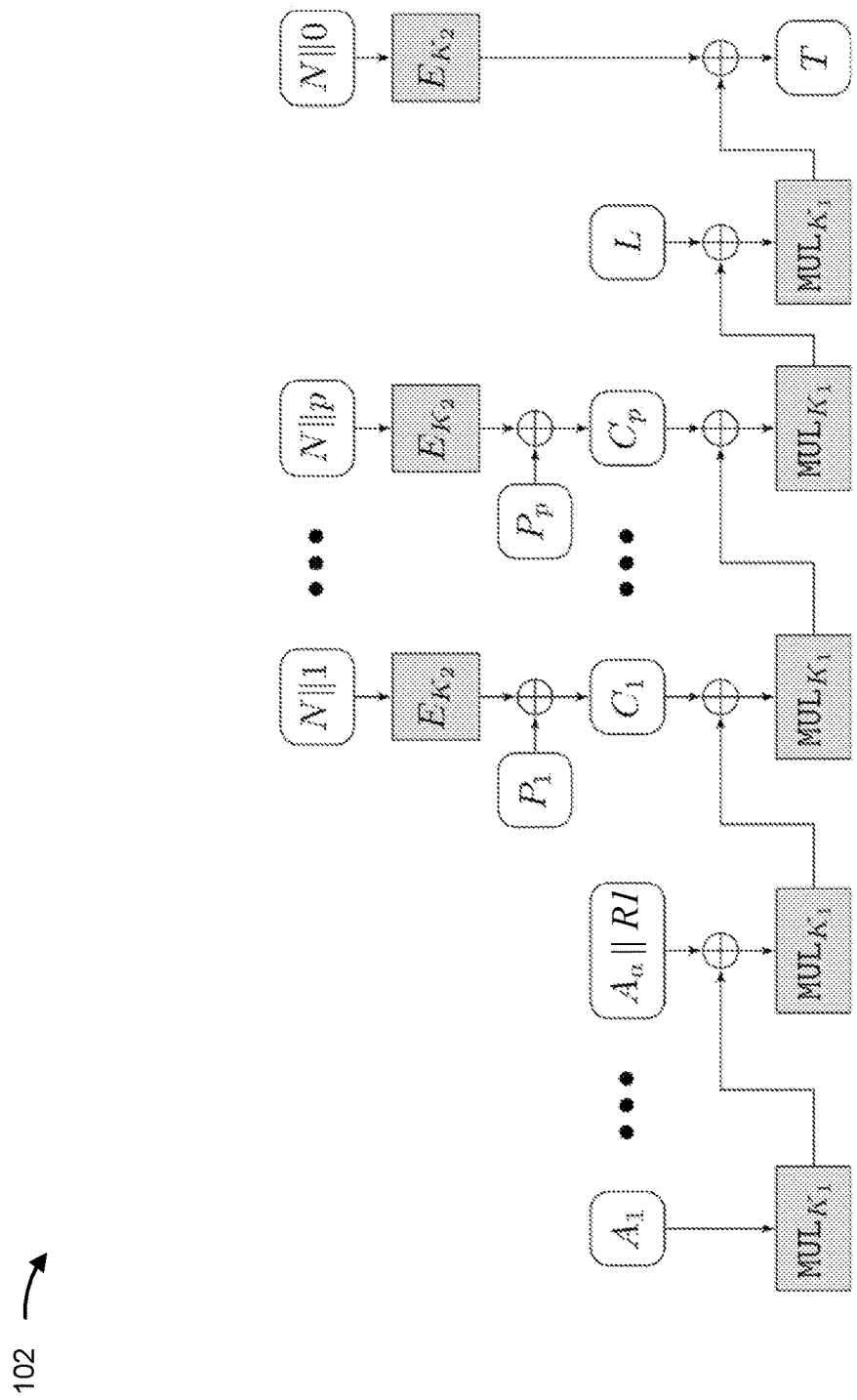
FIG. 2 is a diagram illustrating an example implementation of a transmitter configured for operation in an advanced encryption standard with Galois/counter mode (AES-GCM) operation mode in association with providing safe and secure communication as described herein.

FIG. 2 is a diagram illustrating an example implementation of a transmitter 102 configured for operation in an AES-GCM operation mode in association with providing safe and secure communication as described herein.

In operation, the redundancy information R1 is computed by the transmitter 102 and appended to the additional data A, which comprises a (a≥1) blocks. A given block may comprise, for example, 128 bits. As shown, a first block $A_1$ is provided as an input for multiplication over a Galois field ($MUL_{K1}$) based on a first key $K_1$. An output of the first multiplication over the Galois field is XORed with a second block $A_2$, a result of which is provided as an input for multiplication over the Galois field based on the first key $K_1$. This operation is repeated for the remaining blocks of the a blocks and the redundancy information R1. In the case of CANsec, the additional data A may comprise 112 bits, and so the additional data A plus redundancy information R1 of 16 bits (e.g., a 16 bit CRC) requires a single multiplication block.

As further shown, the transmitter 102 may encrypt the plaintext P, which comprises p (p≥1) blocks. For example, the transmitter 102 may apply a cryptographic function ($E_{K2}$) to a nonce N that is appended with a first counter value (e.g., 1) and using a second key $K_2$, and may XOR an output of the cryptographic function with a first block $P_1$, with a result of the XOR operation being a first block of ciphertext $C_1$. The transmitter 102 may perform a similar operation for each block of the p blocks of the plaintext P (e.g., such that the transmitter 102 generates p blocks of ciphertext C based on p counter values).

As shown, an output of the last Galois field multiplication associated with the additional data A and the redundancy information R1 is XORed with a first block of ciphertext $C_1$, and a result is provided as an input for multiplication over the Galois field based on the first key $K_1$. An output of this Galois field multiplication is XORed with a second block of ciphertext $C_2$, a result of which is provided as an input for multiplication over the Galois field based on the first key $K_1$. This operation is repeated for the remaining blocks of the p blocks of ciphertext C.

As further shown, a length L of the ciphertext C is XORed with an output of the last Galois field multiplication associated with the ciphertext C, and a result is provided as an input for multiplication over the Galois fields based on the first key $K_1$.

As further shown, the transmitter 102 may apply the cryptographic function to the nonce N after appending a zero value and using the second key $K_2$, and may XOR a result with an output of the Galois field multiplication associated with the length L, a result of which is the MAC T. The transmitter 102 may then transmit the additional data A, the ciphertext C, and the MAC T. Here, the transmitter 102 does not transmit the redundancy information R1.

In this way, the transmitter 102 may provide authenticated encryption for the ciphertext C, as well as authentication for the additional data A, the length L, and the nonce N, while enabling detection of an encryption error without increasing overhead, as described above with respect to FIG. 1.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
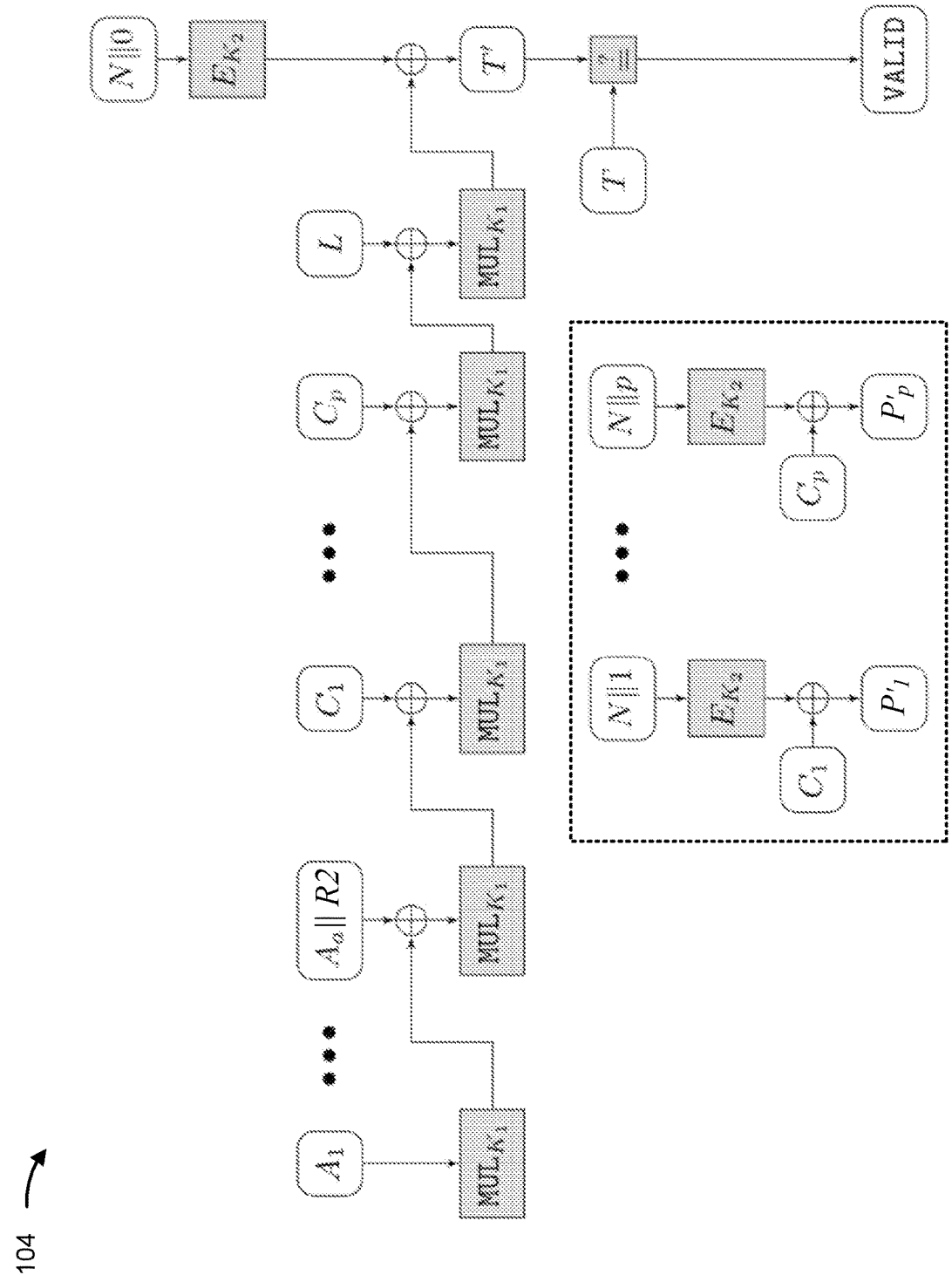
FIG. 3 is a diagram illustrating an example implementation of a receiver configured for operation in an AES-GCM operation mode in association with providing safe and secure communication as described herein.

FIG. 3 is a diagram illustrating an example implementation of a receiver 104 configured for operation in an AES-GCM operation mode in association with providing safe and secure communication as described herein. In the example shown in FIG. 3, the receiver 104 has received ciphertext C, additional data A, and a MAC T from the transmitter 102, as described above with respect to FIG. 2.

In operation, the receiver 104 may decrypt the ciphertext C, which comprises p (p≥1) blocks. For example, the receiver 104 may apply the cryptographic function ($E_{K2}$) to the nonce N that is appended with the first counter value (e.g., 1) and using the second key $K_2$, and may XOR an output of the cryptographic function with a first block $C_1$, with a result of the XOR operation being a first block of decrypted plaintext P'. The receiver 104 may perform a similar operation for each block of the p blocks of the ciphertext C such that the receiver 104 generates p blocks of decrypted plaintext P' based on p counter values.

Next, the receiver 104 may compute the redundancy information R2 (e.g., by applying a redundancy function to the decrypted plaintext P'), and may append the redundancy information R2 to the additional data A, which comprises a (a≥1) blocks. As shown, a first block $A_1$ is provided as an input for multiplication over a Galois field ($MUL_{K1}$) based on the first key $K_1$. An output of the first multiplication over the Galois field is XORed with a second block $A_2$, a result of which is provided as an input for multiplication over the Galois field based on the first key $K_1$. This operation is repeated for the remaining blocks of the a blocks and the redundancy information R1.

As shown, an output of the last Galois field multiplication associated with the additional data A and the redundancy information R2 is XORed with a first block of ciphertext $C_1$, and a result is provided as an input for multiplication over the Galois field based on the first key $K_1$. An output of this Galois field multiplication is XORed with a second block of ciphertext $C_2$, a result of which is provided as an input for multiplication over the Galois field based on the first key $K_1$. This operation is repeated for the remaining blocks of the p blocks of ciphertext C.

As further shown, the length L of the ciphertext C is XORed with an output of the last Galois field multiplication associated with the ciphertext C, and a result is provided as an input for multiplication over the Galois fields based on the first key $K_1$.

As further shown, the receiver 104 may apply the cryptographic function to the nonce N after appending a zero value and using the second key $K_2$, and may XOR a result with an output of the Galois field multiplication associated with the length L, a result of which is the MAC T'. The receiver 104 may then determine whether the MAC T' computed by the receiver 104 matches the MAC T received in the message, and may perform authentication of the message accordingly, as described with respect to FIG. 1.

In this way, the receiver 104 may provide authenticated encryption for the ciphertext C, as well as authentication for the additional data A, the length L, and the nonce N, while enabling detection of an encryption error at the transmitter 102 or a decryption error at the receiver 104, as described above with respect to FIG. 1.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
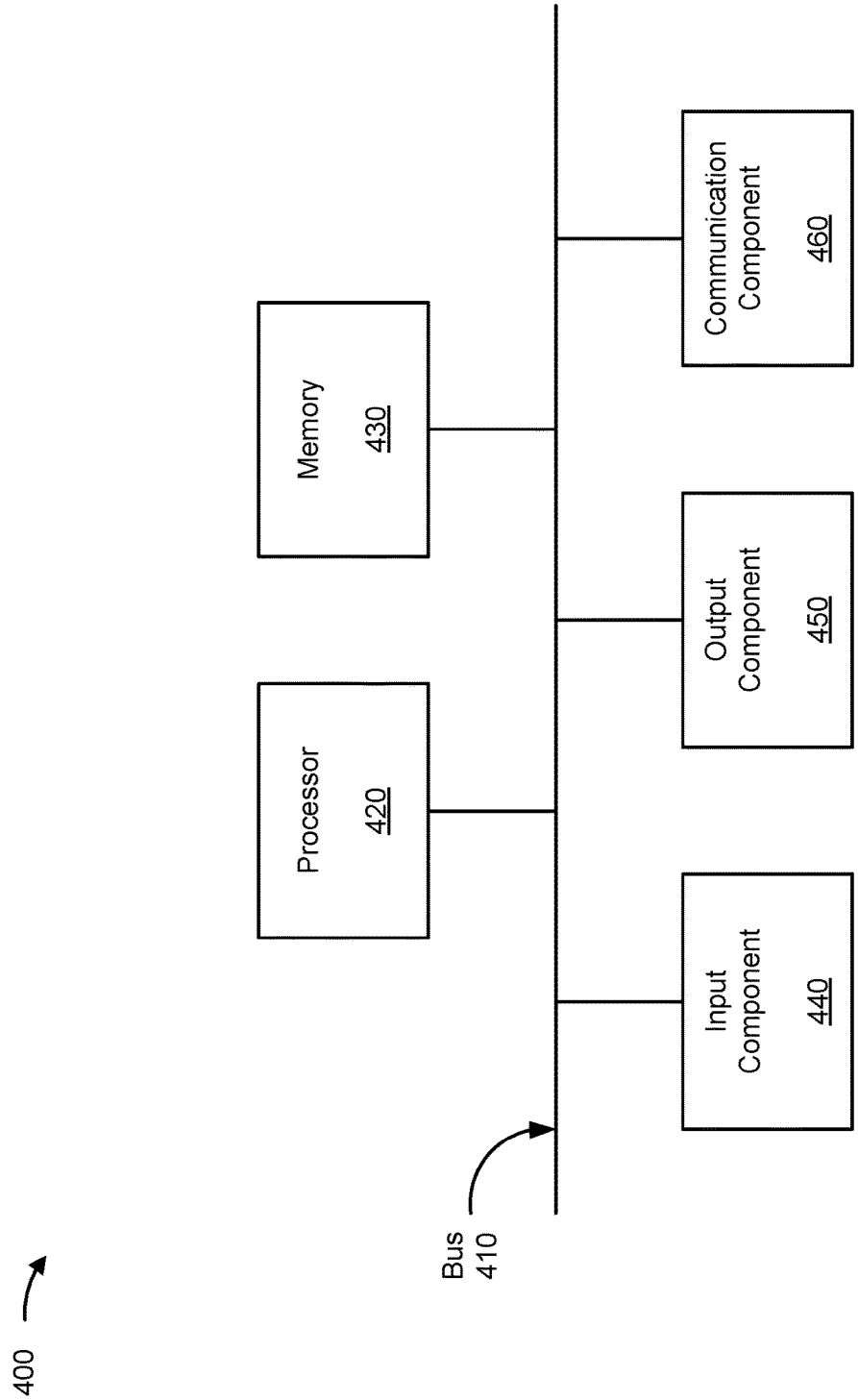
FIG. 4 is a diagram of example components of a device associated with providing safe and secure communication as described herein.

FIG. 4 is a diagram of example components of a device 400 associated with associated with providing safe and secure communication as described herein. The device 400 may correspond to transmitter 102 and/or receiver 104. In some implementations, the transmitter 102 and/or the receiver 104 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
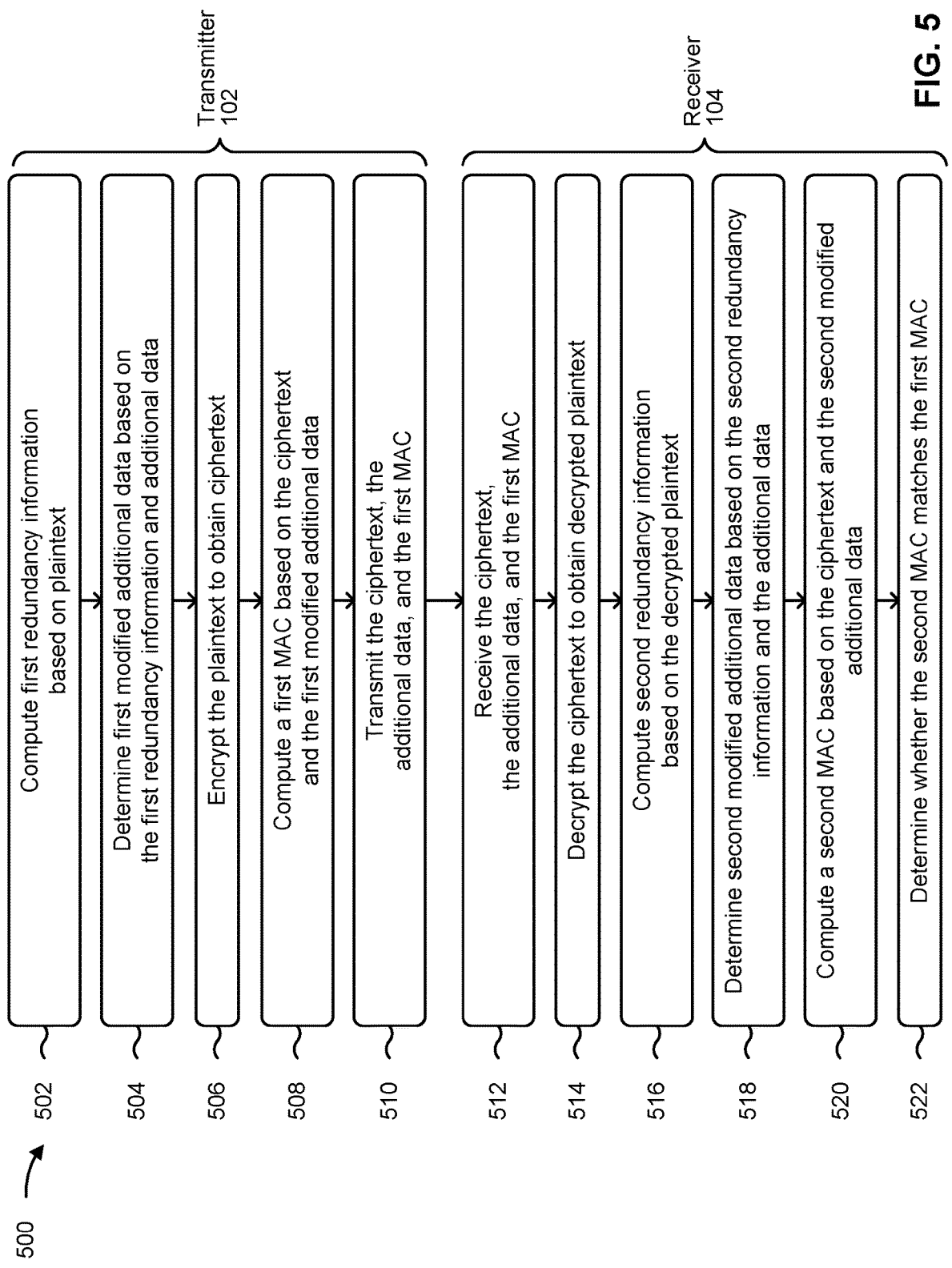
FIG. 5 is a flowchart of an example process associated with safe and secure communication as described herein.

FIG. 5 is a flowchart of an example process 500 associated with safe and secure communication as described herein. In some implementations, one or more process blocks of FIG. 5 are performed by a transmitter (e.g., a transmitter 102) or a receiver (e.g., a receiver 104). Additionally, or alternatively, one or more process blocks of FIG. 5 may be performed by one or more components of a device 400, such as processor 420, memory 430, input component 440, output component 450, and/or communication component 460.

As shown in FIG. 5, process 500 may include computing first redundancy information based on plaintext (block 502). For example, the transmitter may compute first redundancy information based on plaintext, as described above.

As further shown in FIG. 5, process 500 may include determining first modified additional data based on the first redundancy information and additional data (block 504). For example, the transmitter may determine first modified additional data based on the first redundancy information and additional data, as described above.

As further shown in FIG. 5, process 500 may include encrypting the plaintext to obtain ciphertext (block 506). For example, the transmitter may encrypt the plaintext to obtain ciphertext, as described above.

As further shown in FIG. 5, process 500 may include computing a first MAC based on the ciphertext and the first modified additional data (block 508). For example, the transmitter may compute a first MAC based on the ciphertext and the first modified additional data, as described above.

As further shown in FIG. 5, process 500 may include transmitting a message including the ciphertext, the additional data, and the first MAC (block 510). For example, the transmitter may transmit a message including the ciphertext, the additional data, and the first MAC, as described above.

As shown in FIG. 5, process 500 may include receiving the message including the ciphertext, the additional data, and the first MAC (block 512). For example, the receiver may receive the message including the ciphertext, the additional data, and the first MAC, as described above.

As further shown in FIG. 5, process 500 may include decrypting the ciphertext to obtain decrypted plaintext (block 514). For example, the receiver may decrypt the ciphertext to obtain decrypted plaintext, as described above.

As further shown in FIG. 5, process 500 may include computing second redundancy information based on the decrypted plaintext (block 516). For example, the receiver may compute second redundancy information based on the decrypted plaintext, as described above.

As further shown in FIG. 5, process 500 may include determining second modified additional data based on the second redundancy information and the additional data (block 518). For example, the receiver may determine second modified additional data based on the second redundancy information and the additional data, as described above.

As further shown in FIG. 5, process 500 may include computing a second MAC based on the ciphertext and the second modified additional data (block 520). For example, the receiver may compute a second MAC based on the ciphertext and the second modified additional data, as described above.

As further shown in FIG. 5, process 500 may include determining whether the second MAC matches the first MAC (block 600). For example, the receiver may determine whether second MAC matches the first MAC, as described above.

Process 500 may include additional implementations, such as any single implementation or any combination of implementations described below and/or in connection with one or more other processes described elsewhere herein.

In a first implementation, the transmitter, when computing the first redundancy information, is configured to apply a redundancy function to the plaintext, wherein the first redundancy information is a result of applying the redundancy to the plaintext.

In a second implementation, alone or in combination with the first implementation, the transmitter, when determining the first modified additional data, is configured to append the first redundancy information to the additional data.

In a third implementation, alone or in combination with one or more of the first and second implementations, the transmitter and the receiver are configured to operate in an AES-GCM operation mode.

In a fourth implementation, alone or in combination with one or more of the first through third implementations, the transmitter is configured not to transmit the first redundancy information.

In a fifth implementation, alone or in combination with one or more of the first through fourth implementations, the receiver, when computing the second redundancy information, is configured to apply a redundancy function to the decrypted plaintext, wherein the second redundancy information is a result of applying the redundancy to the decrypted plaintext.

In a sixth implementation, alone or in combination with one or more of the first through fifth implementations, the receiver, when determining the second modified additional data, is configured to append the second redundancy information to the additional data.

In a seventh implementation, alone or in combination with one or more of the first through sixth implementations, the receiver is further configured to provide an error indication based on a determination that the second MAC does not match the first MAC.

In an eighth implementation, alone or in combination with one or more of the first through seventh implementations, the receiver is further configured to provide an authentication indication based on a determination that the second MAC matches the first MAC.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter, comprising:
   one or more processors configured to:
      compute redundancy information based on plaintext, the redundancy information being associated with determining whether the plaintext has been encrypted without an encryption error;
      determine modified additional data based on the redundancy information and additional data, wherein the one or more processors are configured to modify the additional data based on the redundancy information to obtain the modified additional data;

encrypt the plaintext to obtain ciphertext;

compute a message authentication code based on the ciphertext and the modified additional data; and transmit a message including the ciphertext, the additional data, and the message authentication code.

2. The transmitter of claim 1, wherein the one or more processors, when computing the redundancy information, are configured to apply a redundancy function to the plaintext, wherein the redundancy information is a result of applying the redundancy function to the plaintext.

3. The transmitter of claim 2, wherein the redundancy function comprises at least one of an error detection code function, a cyclic redundancy check function, or an error correction code function.

4. The transmitter of claim 1, wherein the modified additional data is determined by appending the redundancy information to the additional data.

5. The transmitter of claim 1, wherein the transmitter is configured to operate in an advanced encryption standard with Galois/counter mode (AES-GCM) operation mode or an Ascon operation mode.

6. The transmitter of claim 1, wherein the transmitter is configured to operate in an Ascon operation mode using a light-weight cipher.

7. The transmitter of claim 1, wherein the one or more processors are further configured to refrain from transmitting the redundancy information.

8. The transmitter of claim 1, wherein the plaintext, the redundancy information, and the additional data are mutually exclusive.

9. The transmitter of claim 1, wherein the message does not include the redundancy information or the modified additional data.

10. The transmitter of claim 1, wherein the transmitter is configured to not transmit the redundancy information or the modified additional data.

11. A receiver, comprising:
one or more processors configured to:
receive a message including ciphertext, additional data, and a first message authentication code;
decrypt the ciphertext within the message to obtain plaintext;
compute redundancy information based on the plaintext;
determine modified additional data based on the redundancy information and the additional data within the message, wherein the one or more processors are configured to modify the additional data based on the redundancy information to obtain the modified additional data;
compute a second message authentication code based on the ciphertext and the modified additional data; and
determine whether the second message authentication code matches the first message authentication code within the message.

12. The receiver of claim 11, wherein the one or more processors, when computing the redundancy information, are configured to apply a redundancy function to the plaintext, wherein the redundancy information is a result of applying the redundancy function to the ciphertext.

13. The receiver of claim 12, wherein the redundancy function comprises at least one of an error detection code function, a cyclic redundancy check function, or an error correction code function.

14. The receiver of claim 11, wherein the modified additional data is determined by appending the redundancy information to the additional data.

15. The receiver of claim 11, wherein the receiver is configured to operate in an advanced encryption standard with Galois/counter mode (AES-GCM) operation mode or an Ascon operation mode.

16. The receiver of claim 11, wherein the receiver is configured to operate in an Ascon operation mode using a light-weight cipher.

17. The receiver of claim 11, wherein the one or more processors are further configured to provide an error indication based on a determination that the second message authentication code does not match the first message authentication code within the message.

18. The receiver of claim 11, wherein the one or more processors are further configured to provide an authentication indication based on a determination that the second message authentication code matches the first message authentication code within the message.

19. The receiver of claim 11, wherein the message does not include the redundancy information or the modified additional data.

20. A system, comprising:
a transmitter configured to:
compute first redundancy information based on plaintext, the first redundancy information being associated with determining whether the plaintext has been encrypted without an encryption error,
determine first modified additional data based on the first redundancy information and additional data, wherein the transmitter is configured to modify the additional data based on the first redundancy information to obtain the first modified additional data,
encrypt the plaintext to obtain ciphertext,
compute a first message authentication code based on the ciphertext and the first modified additional data, and
transmit a message including the ciphertext, the additional data, and the first message authentication code; and
a receiver configured to:
receive the message including the ciphertext, the additional data, and the first message authentication code;
decrypt the ciphertext to obtain decrypted plaintext;
compute second redundancy information based on the decrypted plaintext;
determine second modified additional data based on the second redundancy information and the additional data wherein the receiver is configured to modify the additional data based on the second redundancy information to obtain the second modified additional data;
compute a second message authentication code based on the ciphertext and the second modified additional data; and
determine whether the second message authentication code matches the first message authentication code.

21. The system of claim 20, wherein the transmitter, when computing the first redundancy information, is configured to apply a redundancy function to the plaintext, wherein the first redundancy information is a result of applying the redundancy function to the plaintext.

22. The system of claim 20, wherein the transmitter, when determining the first modified additional data, is configured to append the first redundancy information to the additional data.

23. The system of claim 20, wherein the receiver, when computing the second redundancy information, is configured to apply a redundancy function to the decrypted plaintext, wherein the second redundancy information is a result of applying the redundancy to the decrypted plaintext.

24. The system of claim 20, wherein the receiver, when determining the second modified additional data, is configured to append the second redundancy information to the additional data.

* * * * *